(12) United States Patent
Gey

(10) Patent No.: US 7,735,207 B2
(45) Date of Patent: Jun. 15, 2010

(54) PROCESS FOR MAKING A PLASTIC-LINED METALLIC PIPE FOR CONVEYING LIQUID OR GAS

(76) Inventor: Anna Kui Gey, 1851 Gresham Dr., Alameda, CA (US) 94501

( * ) Notice: Subject to any disclaimer, the term of this patent is extended or adjusted under 35 U.S.C. 154(b) by 0 days.

(21) Appl. No.: 12/322,752

(22) Filed: Feb. 7, 2009

(65) Prior Publication Data

US 2009/0139075 A1 Jun. 4, 2009

Related U.S. Application Data

(62) Division of application No. 11/479,696, filed on Jun. 30, 2006.

(51) Int. Cl.
*B23P 11/02* (2006.01)
(52) U.S. Cl. ........................................ 29/447
(58) Field of Classification Search .................. 29/447, 29/450, 505, 469.5, 508, 516, 272; 138/41, 138/141, 142, 151, 137, 138, 143, 145
See application file for complete search history.

(56) References Cited

U.S. PATENT DOCUMENTS 3,071,162 A * 1/1963 Mick ........................... 138/140
6,546,963 B2 * 4/2003 Nuss ........................... 138/141

* cited by examiner

*Primary Examiner*—John C Hong
(74) *Attorney, Agent, or Firm*—Leon E. Jew; Dahyee Law Group

(57) ABSTRACT

A process for making plastic-lined metallic pipes for conveying liquid or gas includes the steps of heating a metallic pipe evenly to a first temperature; cooling a plastic pipe evenly to a second temperature; inserting the plastic pipe into the metallic pipe to constitute an inner sleeve; drawing the metallic pipe from its two ends; and cooling the sleeved pipe to a storage temperature. The pipe includes a continuous inner plastic sleeve and an outer seamless metallic pipe. The outer diameter of the plastic sleeve is circumferentially melt-bonded to the inner diameter of the outer pipe. The plastic sleeve constitutes an uninterrupted lining for the metallic pipe.

4 Claims, 7 Drawing Sheets

(a)          (b)

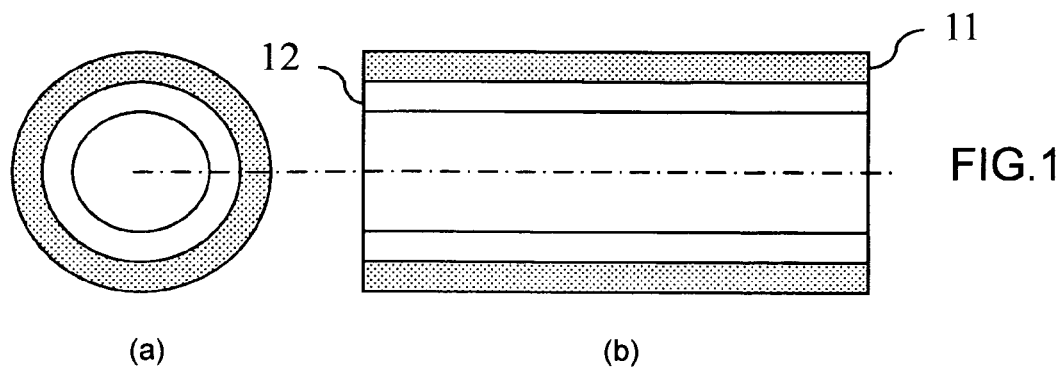
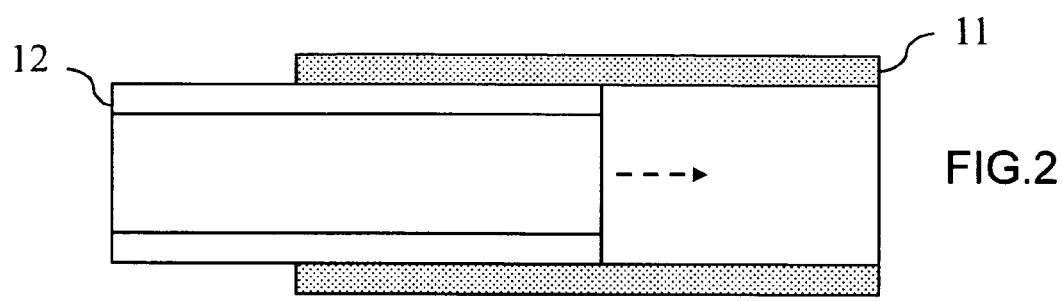
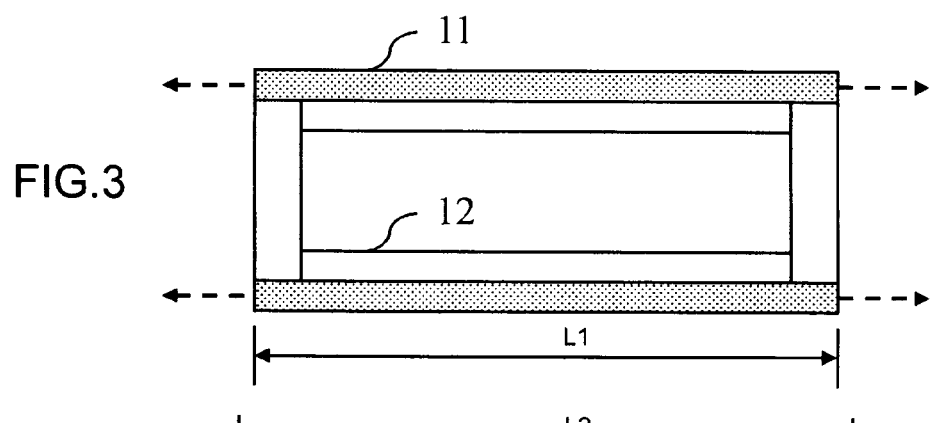
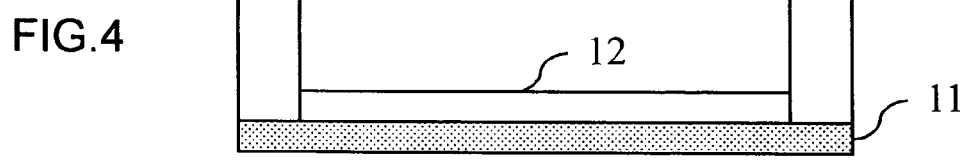

PROCESS FOR MAKING A PLASTIC-LINED METALLIC PIPE FOR CONVEYING LIQUID OR GAS

REFERENCE TO RELATED APPLICATION

This application is a divisional application of, and claims the benefit of priority to, U.S. patent application Ser. No. 11/479,696, entitled "A PLASTIC-LINED METALLIC PIPE FOR CONVEYING DRINKING-WATER AND THE CONNECTORS FOR THE SAME," filed on Jun. 30, 2006, the content of which is incorporated in its entirety by reference herein. The applicant certifies that there is no new matter included in this divisional application.

BACKGROUND OF THE INVENTION

1. Technical Field of the Invention

The present invention generally relates to the field of designing and manufacturing of metallic pipe for conveying drinking-water. More particularly the invention relates to a pipe with an outer metallic pipe and an inner plastic pipe suitable for conveying drinking-water and the connectors for the pipe.

2. Description of the Related Art

Zecchin, et al, in PCT/EP98/08182, disclosed a composite pipe made of metal-plastic for hydro-thermo-sanitary plants and process for the production thereof. The composite pipe consist of an internal metal pipe, an outer pipe made of a plastic suitable for conveying drinking-water, and an intermediate layer having a bi-adhesive function. The outer pipe and the intermediate layer are both extruded onto the inner metal pipe. The material for the outer pipe and the intermediate layer preferably contains an anti-oxidizer additive for the pipe metal. The primary purpose of Zecchin's invention is to prevent corrosions due to the action of local leakage currents and/or chemical corrosion caused by acid substances released from building materials like concrete of the floors in which the pipes are embedded.

David A. Shotts, et al, in U.S. Pat. No. 5,152,323, disclosed a plastic-lined metal pipe which includes an outer metallic pipe having a longitudinal weld and an inner plastic sleeve melt-bonded to the metallic pipe. The metallic pipe is of a size to be in mechanical engagement with the sleeve around the entire circumference of the sleeve. The pipe is manufactured using an extruder, for providing a plastic sleeve, in conjunction with a continuous roll-forming tubing mill production line, for forming and treating the metallic outer tube, so that the lined pipe is made using a continuous process. The plastic sleeve is caused to not collapse during the manufacturing process and the sleeve and pipe are firmly locked together. The pipe may be made by apparatus for continuously manufacturing plastic-lined metal pipe including an extruder for providing a plastic sleeve and a continuous roll-forming tubing mill production line. The production line operates to sequentially deform a substantially flat steel strip to a generally tubular configuration and includes an electric resistance welder or high frequency welder for continuously welding the lateral edges of the moving strip to complete the pipe. A plastic sleeve is fed into the about-to-be-formed metallic pipe upstream of the welder. This plastic sleeve has an outside diameter slightly smaller than the inside diameter of the metallic pipe in the as-formed condition of the sleeve and the sleeve maintains its generally tubular configuration from the time it is inserted into the metal pipe until the manufacture is completed. The production line also includes a station for reducing the inside diameter of the metallic pipe to substantially the outside diameter of the plastic sleeve thereby locking the two components together.

Alexander Esser in U.S. Pat. No. 6,575,197 disclosed a double-layer pipe for fluidic transport of abrasive solids. The pipe includes a hardened inner pipe portion of steel; an outer pipe portion of weldable steel; terminal coupling collars made of weldable steel; and a heat-insulating layer disposed between the inner pipe portion and the outer pipe portion. The pipe includes a heat-insulating layer between the inner pipe portion and the outer pipe portion to form a barrier during heating of the inner pipe portion to thereby prevent heat from dissipating to a significant degree from the inner pipe portion to the outer pipe portion. The applied heat remains in the inner pipe portion so that the inner pipe portion, especially when thin pipe walls are involved, can be heated evenly within a very narrow temperature window. When the inner pipe portion is then quenched, a markedly even hardness is realized over the entire circumference as well as length of the inner pipe portion. The heat-insulating layer disposed between the inner pipe portion and the outer pipe portion may be formed by a coating made of a combustible non-metallic material and applied upon the outer surface of the inner pipe portion and/or the inner surface of the outer pipe portion.

John Werner in U.S. Pat. No. 4,507,842 disclosed an improved method for sealing and protecting a plastic lined pipe joint. The improved plastic collar seal is placed in the interior of a pipe joint formed between first and second externally threaded plastic lined pipe sections which are to be held together by an internally threaded pipe collar. The improved plastic collar seal is a hollow, open ended, cylindrical plastic collar seal presized to concentrically fit within the plastic liner of the sections of plastic lined pipe with minimum concentric tolerance. The open ends of the plastic collar seal are internally beveled and the plastic collar seal is equipped with external O-ring grooves and O-rings at each of the ends. The collar seal is further provided with an external ledge or ridge molded concentrically to the collar seal between the O-rings wherein the ledge is adapted to fit within the internally threaded collar and rest on the end of the lined pipe. This ledge is positioned such that the distance from at least one end of the collar seal to the ledge exceeds the length of the internally threaded collar. In operation, the collar is threaded on the first plastic lined pipe section and the improved plastic collar seal is inserted within the pipe section and collar with the ledge coming to rest on the end of the pipe section leaving the other end of the plastic collar seal extending beyond the collar. The second section of plastic lined pipe can then be easily threaded into the internally threaded collar, over the collar seal, thus forming a tight pipe joint with the collar seal within the joint.

John J. Hunter in U.S. Pat. No. 4,709,946 disclosed a pipe joint which secures two lined pipe sections together and seals the juncture of the pipe sections against the migration of fluids through the joint and methods for forming the pipe joint. The method includes the steps of axially aligning first and second pipe sections; securing the first pipe section to the second pipe section; overlapping the liners of the first and second pipe sections; and compressing the liners of the first and second pipe sections where overlapped to seal the joint against migration of pressurized fluids through the joint. The pipe joint provided by this method includes, in one embodiment, first pipe means having a fluid impervious first liner mounted on the interior thereof; second pipe means having a fluid impervious second liner mounted on the interior thereof; means for securing said first pipe means in axial alignment with said second pipe means wherein said first liner and said second liner are partially overlapped; and means for compressing said first and second liners were overlapped to seal the pipe joint formed at the juncture of said first and second pipe means for the transmission of fluids there through.

What is desired is a plastic-lined metallic pipe with a food-grade non-poisonous inner plastic lining pipe and an outer metallic pipe made of high strength, light-weight and corrosion resistant aluminum alloy.

SUMMARY OF THE INVENTION

The plastic-lined metallic pipe for conveying liquid or gas includes a continuous inner plastic sleeve or pipe and an outer seamless metallic pipe. The outer diameter of the inner plastic sleeve is circumferentially melt-bonded to the inner diameter of the outer metallic pipe. The inner plastic sleeve constitutes an uninterrupted lining for the outer metallic pipe. The inner plastic sleeve is formed of a non-poisonous plastic, such as polypropylene, suitable for conveying drinking-water. The outer metallic pipe is formed of aluminum alloy.

The process for a plastic-lined metallic pipe for conveying liquid or gas includes at least the steps of: (1) heating a metallic pipe evenly to a first temperature at which the metallic pipe has a higher tensility; (2) cooling a plastic pipe evenly to a second temperature which is lower than the regular storage temperature; (3) inserting the plastic pipe into the metallic pipe to constitute an inner sleeve; (4) drawing the metallic pipe from its two ends for a specific length; and (5) cooling the sleeved pipe to a storage temperature.

Also disclosed is a connector used for connecting plastic-lined metallic pipes. The connector includes the following components:

1. at least one metallic member as the body having a first stepped cylindrical inner space and a section of thread in its outer wall, the first stepped cylindrical inner space including a first cylindrical space as a conveying channel, a second cylindrical space for holding a pipe to be connected to the body, a tapered cylindrical space, and a third cylindrical space, the first cylindrical space's diameter being identical with the pipe's inner diameter and the second cylindrical space's diameter being slightly larger than the pipe's outer diameter, the tapered cylindrical space merging the second cylindrical space with the third cylindrical space;
2. a cap or nut having a second stepped cylindrical inner space and having a section of thread in its inner wall for coupling with the body, the second stepped cylindrical inner space including a fourth cylindrical space for coupling with the body and a fifth cylindrical space in the cap's end wall for holding the pipe, the fifth cylindrical space's diameter being slightly larger than the pipe's outer diameter;
3. a tapered rubber washer for filling the gap between the pipe and the wall of the second cylindrical space and filling the tapered cylindrical space of the body;
4. a metallic washer for pressing the rubber washer; and
5. a "c" type spring washer for locking the pipe when the cap is being coupled with the body, the spring washer having a rough inner surface or a section of male thread for enforcing the locking.

In the operation to connect the pipe to the body, the following assembling order is required: inserting one end of the pipe through the cap from the cap's end wall, then through the "c" type spring washer, the metallic washer and the tapered rubber washer with its wider end facing the metallic washer, then inserting the one end of the pipe into the second cylindrical space of the body, then sliding the tapered rubber washer and the metallic washer into the third cylindrical space of the body, then slightly squeezing the spring washer and inserting it into the third cylindrical space of the body, and then screwing the cap in.

BRIEF DESCRIPTION OF DRAWINGS

FIG. 1 is a schematic diagram showing the cross-sectional views of the plastic-lined metallic pipe according to the preferred embodiment of the present invention;

FIG. 2 is a schematic diagram showing the process of inserting the inner plastic pipe into the outer metallic pipe;

FIG. 3 and FIG. 4 are schematic diagrams showing the process of drawing the outer metallic pipe to make the outer metallic pipe being bond to the inner plastic pipe;

FIG. 9 is a schematic diagram illustrating the connector's inner structure when the cap is screwed in;

FIG. 15A is a schematic diagram illustrating the inner structure of the connector before the cap is entirely screwed in;

FIG. 15B is a schematic diagram illustrating the inner structure of the connector after the cap is entirely screwed in;

FIG. 16C is a schematic diagram illustrating the inner structure of the connector when the cap is being screwed in.

DETAILED DESCRIPTION OF THE INVENTION

The plastic-lined metallic pipe according to the typical embodiment of the present invention, as shown in FIG. 1, consists of an outer metallic pipe 11 and an inner plastic pipe 12 suitable for conveying drinking-water. There is no intermediate layer between the inner plastic pipe and the outer metallic pipe. In other words, the inner plastic pipe and the outer metal pipe are firmly bond or melt-bond.

The outer seamless pipe is made of alloy material with the features of high mechanical strength, non-aging, corrosion resistance and shock resistance.

The inner pipe is made of food-grade non-poisonous Polypropylene (PP), which is pollution free, corrosion resistant and low resistance in liquid.

Figure 5:
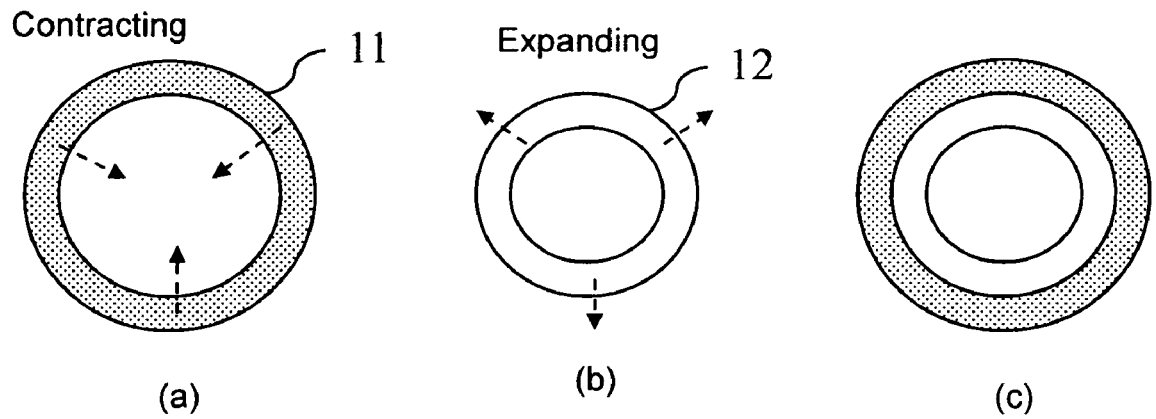
FIG. 5 is a schematic diagram showing the process of cooling the outer metallic pipe to make the outer metallic pipe being firmly bond to the inner plastic pipe.
Figure 6:
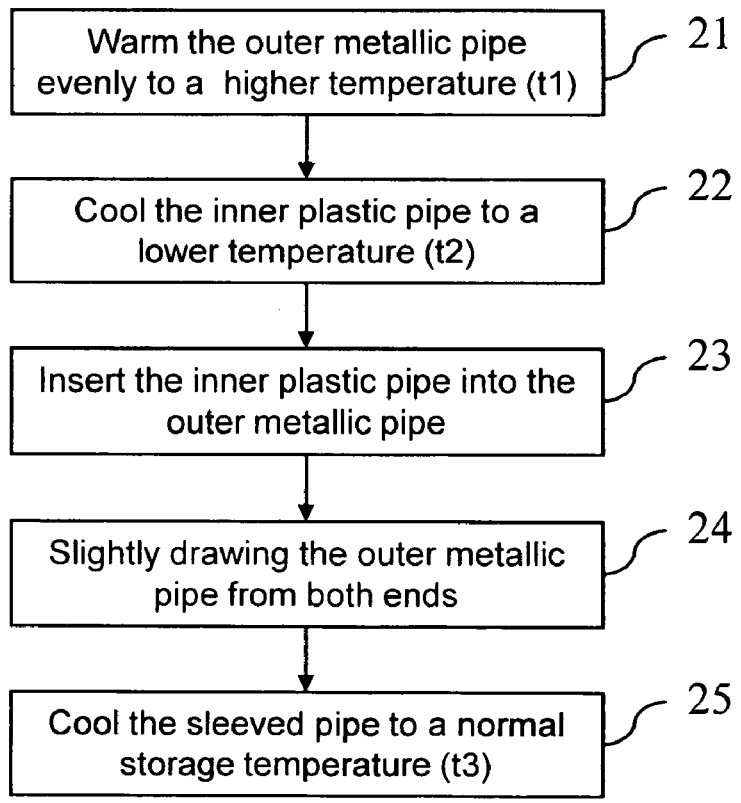
FIG. 6 is a block flow diagram showing the process of making the plastic-lined metallic pipe.

FIG. 3, FIG. 4 and FIG. 5 are cross sectional view diagrams illustrating the process for making the plastic-lined metallic pipe and FIG. 6 is a block flow diagram illustrating the primary steps of the process:

Step 21: Place the alloy outer pipe 11 in a mould with a diameter slightly larger than the outer pipe's outer diameter and warm the outer pipe to a temperature (t1) at which the alloy has a higher tensility.

Step 22: Cool the inner plastic pipe 12 to a temperature (t2) which is usually lower than the normal storage temperature. The outer diameter of the inner pipe 12 is slightly smaller than the inner diameter of the outer pipe 11 so that the inner pipe 11 can be inserted into the outer pipe during the process. At the temperature t2, the inner pipe's diameter is at its shortest point. At a temperature higher than t2, the inner pipe's diameter may increase due to the mechanism of heat expansion.

Step 23: As shown in FIG. 2, insert the inner plastic pipe 12 into the outer alloy pipe 11.

Step 24: Draw from both ends of the outer pipe along the axial direction to extend it for a specific length. As shown in FIG. 3, L1 represents the initial length prior to the drawing, and as shown in FIG. 4, L2 represents the length subsequent to the drawing. The tensile ratio may be 0.1~1% (L2−L1=0.1~1% L1) depending upon the materials used. As shown in FIG. 5 (a), the outer pipe 11 contracts during the drawing. Because the initial temperature of the inner plastic pipe 12 is lower than the outer pipe's temperature, the inner plastic pipe 12 is being warmed up during the process and, as shown in FIG. 5 (b), it expands with the warming. Thus, after the drawing and the accompany heat-transfer, the inner pipe 12 and the outer pipe 11 are tightly merged together as shown in FIG. 5 (c).

Step 25: Cool the outer pipe 11 to a normal temperature (t3). During this cooling phase, as shown in FIG. 5 (a), the outer pipe 11 further contracts such that the pipes are integrated to a melt-bond condition or a substantially melt-bond condition. Note that because the temperature t2 is lower than t3, the cooling process for the outer pipe 11 is actually a warming-up process for the inner pipe 12, and thus, as shown in FIG. 5 (b), it further expands during this phase.

The plastic-lined pipe according to this invention is mechanically superior to stainless steel pipe and copper pipe, while its price is 20% lower than the price of copper pipe.

The outer surface of the plastic-lined pipe is finished by dull polish and antioxidant process to create a sense of metal quality, giving a feeling as bright, elegant and fashionable.

The present invention also includes a connector for connecting the plastic-lined pipes. The connector adopts chrome-plating Al pipe, silica rubber washer and a stainless steel lock-loop design. When installing, just use a regular steel-saw to cut the pipe in proper length, then insert it into the connector's body and tighten the sealing cap. The operation is simple, convenient and fast.

Figure 7:
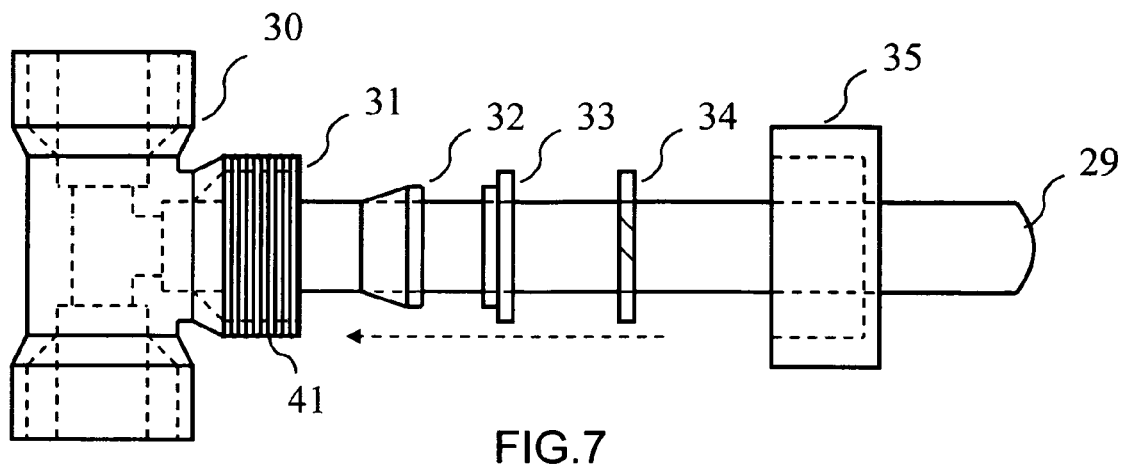
FIG. 7 is a schematic front-view diagram illustrating the components of the connector according to the present invention.
Figure 8:
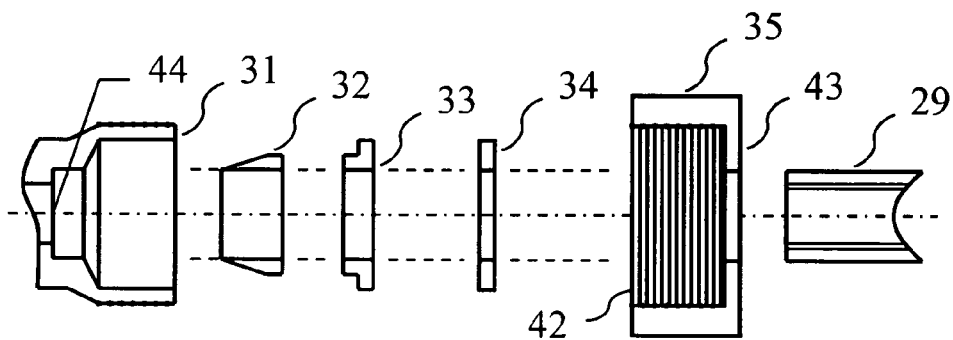
FIG. 8 is a schematic cross sectional view diagram illustrating the components of the connector and the assembling order.

FIG. 7 is a schematic front-view diagram illustrating the components of the connector according to the present invention and FIG. 8 is a schematic cross sectional view diagram illustrating the components of the connector and the assembling order thereof. The connector may have a two-way base or a multiple way base. But the connecting mechanism is same. As illustrated in FIG. 7, the connector has a three-way base 30, which has three identical holding bodies such as 31. The holding body 31 has a section of thread 41 around its outer surface and a stepped cylindrical inner space for holding the pipe 29, the rubber washer 32, the stainless metal washer 33, and the "c" type spring washer 34. The spring washer 34 may have a rough inner surface or a section of male thread for enforcing the locking. Another member of the connector is the cap 35 which has a section of inner thread 42 for coupling with the holding body 31 and has an end wall 43 with a cylindrical hole for holding the pipe 29.

Figure 9:
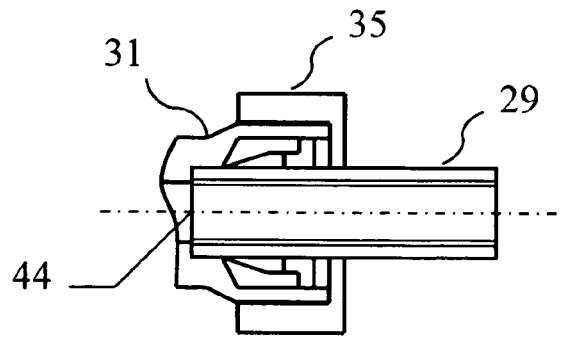

To connect the pipe 29 to the base 30, first insert the pipe 29 into the cap 35, then the "c" type spring washer 34, then the stainless metal washer 33, then the rubber washer 32, and then insert the pipe 29 into the holding body 31 to reach the supporting end 44 as shown in FIG. 8 and FIG. 9. Then, slide the rubber washer 32 and the stainless metal washer 33 into the body 31, and insert the spring washer 34 into the body 31 so that the spring washer 34 has an elastic contact with the inner wall of the body 31. Then, screw the cap 35 toward the body 31. By coupling the cap 35 with the body 31, the washers 32-34 are squeezed toward the body 31 by the end wall 43 of the cap 35. The deeper the cap 35 is screwed in, the tighter the "c" type spring washer 34 is contacted with the pipe 29. In this way, the pipe 29 is firmly connected with the body 31 as shown in FIG. 9.

Figure 10:
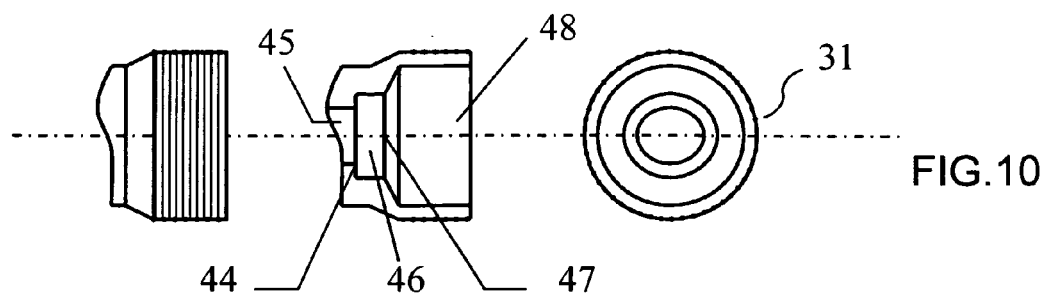
FIG. 10 is a schematic diagram illustrating the side view and the cross sectional views of the connector's body according to a typical embodiment of the present invention.

FIG. 10 is a diagram illustrating the side view and the cross sectional views of the body 31. The first inner cylindrical space 45 is for conveying water or other liquid or gas. The diameter of the first cylinder 45 is identical with the inner diameter of the pipe 29 such that when the liquid or gas is conveyed smoothly from the cylinder 45 to the pipe 29 or vice versa. The second cylindrical space 46 is for holding the pipe 29. The diameter of the cylinder 46 is slightly larger than the diameter of the pipe 29 such that the pipe 29 can be inserted into the cylinder 46. The bottom of the second cylinder 47 adjacent to the first cylinder 45 constitutes the supporting end 44, which is a plain ring surface to be contacted by the cross-cut plain ring surface of the pipe 29. In its front opening, the body 31 has a third cylindrical space 48 for holding the stainless metal washer 33 and the "c" type spring washer 34. The diameter of the third cylindrical space 48 is larger than the diameter of second cylindrical space 46. Further, between the second cylinder 46 and the third cylindrical space is a tapered cylindrical space 47 which merges the third cylindrical space 48 with the second cylindrical space 46.

Figure 11:
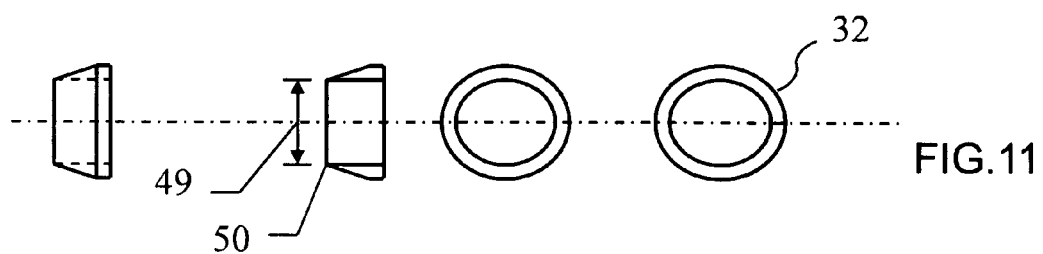
FIG. 11 is a schematic diagram illustrating the side view and the cross sectional views of the tapered rubber washer according to a typical embodiment of the present invention.

FIG. 11 is a diagram illustrating the side view and the cross sectional views of the rubber washer 32. The rubber washer 32 has a tapered cylindrical structure with a thinner front and a thick back. Because it is made of an elastic material, its inner diameter 49 is slightly smaller than the outer diameter of the pipe 29 such that the rubber washer 32 is tightly covered around the pipe 29 when it is slipped on. The tip 50, i.e. the thinner front edge, of the rubber washer 32 is toward the body 31. The tip 50 is inserted into the gap between the pipe 29 and the wall of the cylinder space 46. When the cap 35 is crewed in, the rubber washer 32 is pressed and the gap between the pipe 29 and the wall of the cylinder space 46 is sealed, such that the liquid or gas conveying through the connector and the pipe does not leak out.

Figure 12A:
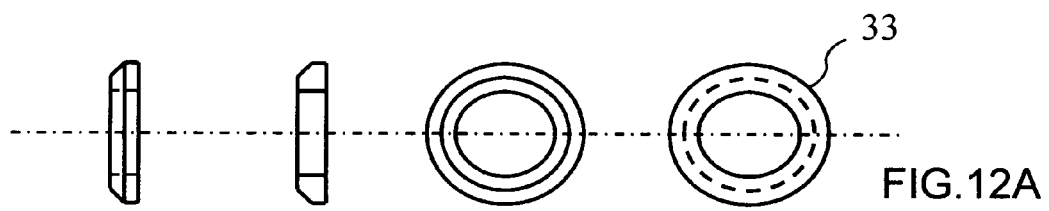
FIG. 12A is a schematic diagram illustrating the side view and the cross sectional views of the stainless metal washer according to a typical embodiment of the present invention.

FIG. 12A is a diagram illustrating the side view and the cross sectional views of the stainless metal washer 33 according to a typical embodiment of the present invention. Referring back to FIG. 9, when the cap 35 is crewed in, the stainless metal washer 33 presses the rubber washer 32 against the body 31 to avoid leak, and at the same time, the stainless metal washer 33 presses the spring washer 34 against the end wall 43 of the cap 35 to force the "c" type spring washer 34 to lock around the pipe 29.

Figure 12B:
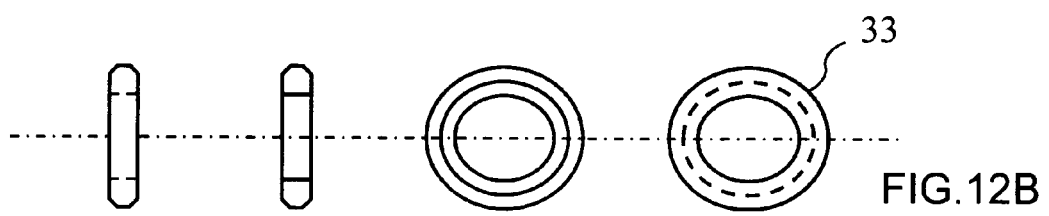
FIG. 12B is a schematic diagram illustrating the side view and the cross sectional views of the stainless metal washer according to another embodiment of the present invention.

FIG. 12B is a diagram illustrating the side view and the cross sectional views of the stainless metal washer 33 according to another embodiment of the present invention.

Figure 12C:
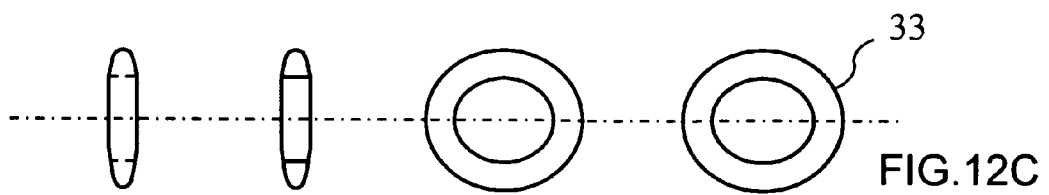
FIG. 12C is a schematic diagram illustrating the side view and the cross sectional views of the stainless metal washer according to another embodiment of the present invention.

Yet FIG. 12C is a diagram illustrating the side view and the cross sectional views of the stainless metal washer 33 according to another embodiment of the present invention.

Figure 13A:
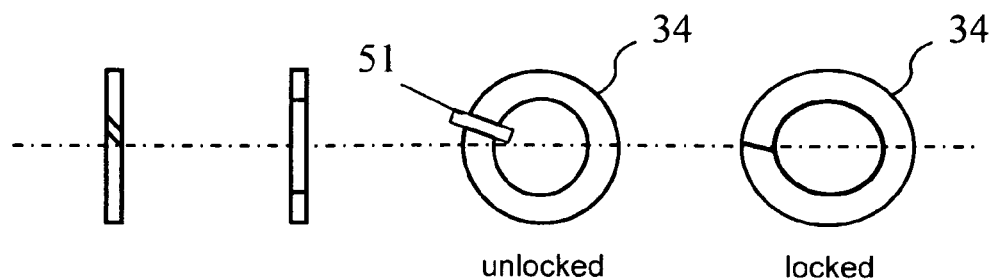
FIG. 13A is a schematic diagram illustrating the side view and the cross sectional views of the "c" type spring washer according to a typical embodiment of the present invention.

FIG. 13A is a diagram illustrating the side view and the cross sectional views of the "c" type spring washer 34 according to a typical embodiment of the present invention. Referring back to FIG. 9, when the cap 35 is crewed in, the end wall 43 of the cap 35 presses the spring washer 34 against the stainless metal washer 33 which further presses the rubber washer 32 against the body 31 to avoid leak, and at the same time, the stainless metal washer 33 presses the spring washer 34 against the end wall 43 of the cap 35 to force the spring washer 34 to lock around the pipe 29. When the pressure is released by screwing out the cap 35, the "c" type spring washer 34 unlocks from the pipe 29 and returns to its original shape.

Figure 13B:
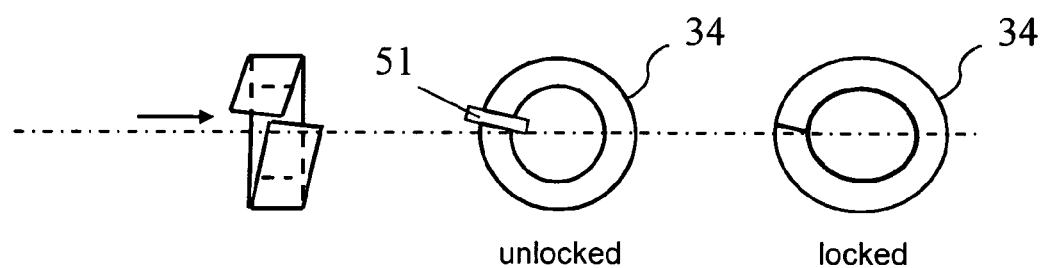
FIG. 13B is a schematic diagram illustrating the side view and the cross sectional views of the "c" type spring washer according to another embodiment of the present invention.

FIG. 13B is a diagram illustrating the side view and the cross sectional views of the "c" type spring washer 34 according to another embodiment of the present invention. The "c" type spring washer 34 responds both to the force from the axial direction. It also responds to the pressure from the surrounding. Before the force is applied on it, it can slide along the pipe 29. However, when the force is applied on it, the gap 51 is getting smaller and smaller such that the spring washer 34 locks on the pipe 29 tightly. When the force is released, the spring washer 34 unlocks from the pipe 29 and returns to its original shape with the gap 51.

Figure 14A:
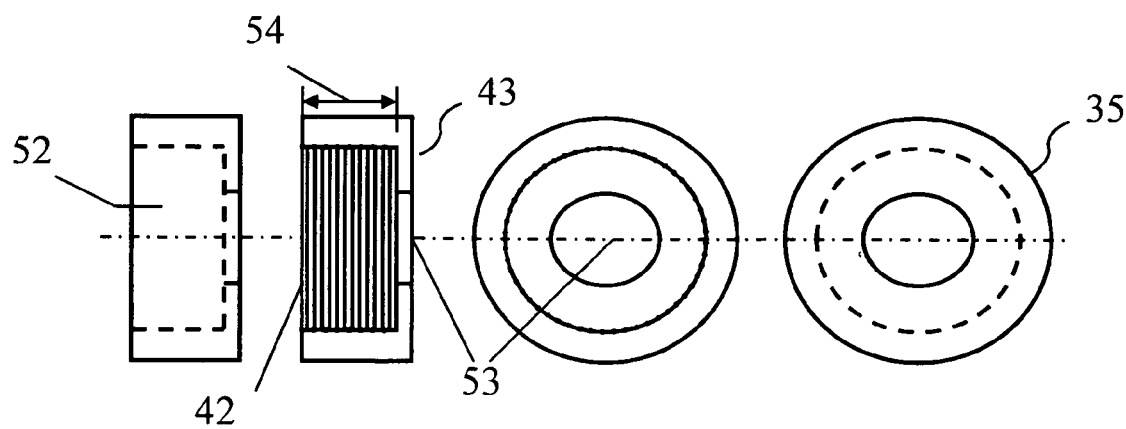
FIG. 14A is a schematic diagram illustrating the side view and the cross sectional views of the cap according to a typical embodiment of the present invention.

FIG. 14A is a diagram illustrating the side view and the cross sectional views of the cap 35 according to a typical embodiment of the present invention. The cap 35 includes a larger cylindrical space 52 and a smaller cylindrical space 53. The larger cylindrical space 52 is enclosed with a section of thread 42 for coupling with the holding body 31. The smaller cylindrical space 53 is for the pipe 29 to be inserted there through. The diameter of the smaller cylindrical space 53 should be slightly larger than the diameter of the pipe 29. The depth 54 of the larger cylindrical space 52 should be smaller than the total thickness of the spring washer 34, the stainless metal washer 33, and the rubber washer 32, such that when the cap 35 is screwed in, the end wall 43 of the cap 35 may provides sufficient pressure on these three washers required to avoid leak and have the spring washer 34 locked around the paper 29.

Figure 14B:
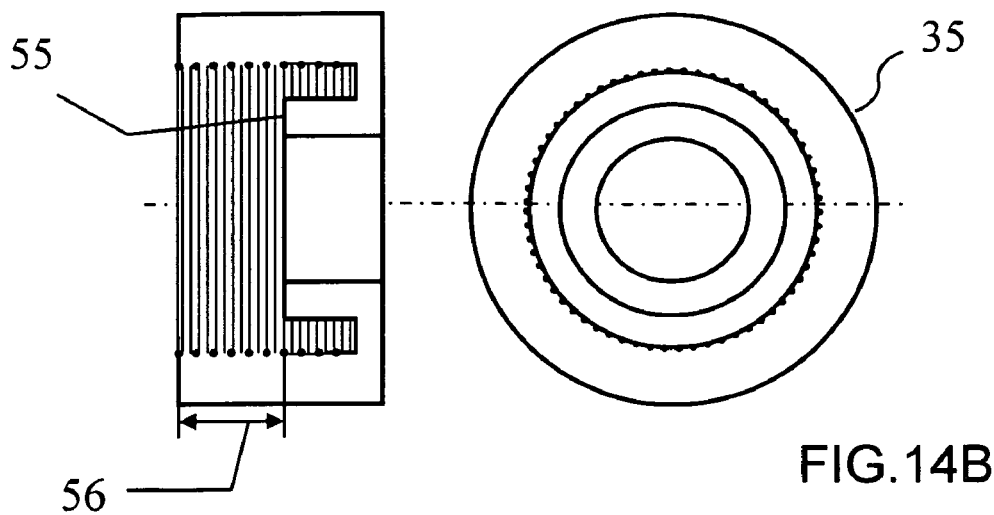
FIG. 14B is a schematic diagram illustrating the side view and the cross sectional view of the cap according to another embodiment of the present invention.

FIG. 14B is a schematic diagram illustrating the side view and the cross sectional view of the cap 35 according to another embodiment of the present invention. In this embodiment, the end wall 43 of the cap 35 has a cylinder 55 extruding toward the body 31. The cylinder 55 is used to strengthen the end wall's support to the "c" spring washer 34. The depth 56 from the front of the cylinder 55 to the front of the cap 35 should be smaller than the total thickness of the spring washer 34, the stainless metal washer 33, and the rubber washer 32, such that when the cap 35 is screwed in, the front of the cylinder 55 of the cap 35 may provides sufficient pressure on these three washers required to avoid leak and have the spring washer 34 locked around the paper 29.

Figure 15A:
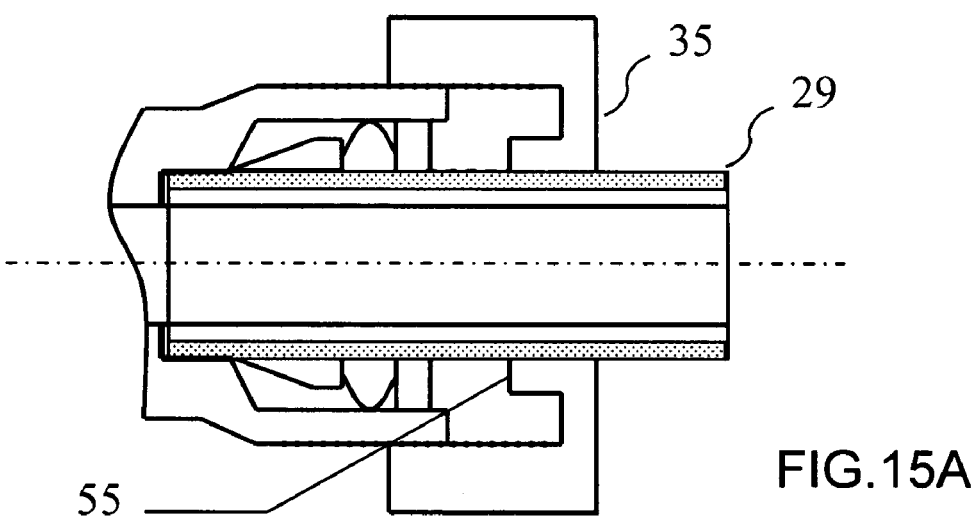
Figure 15B:
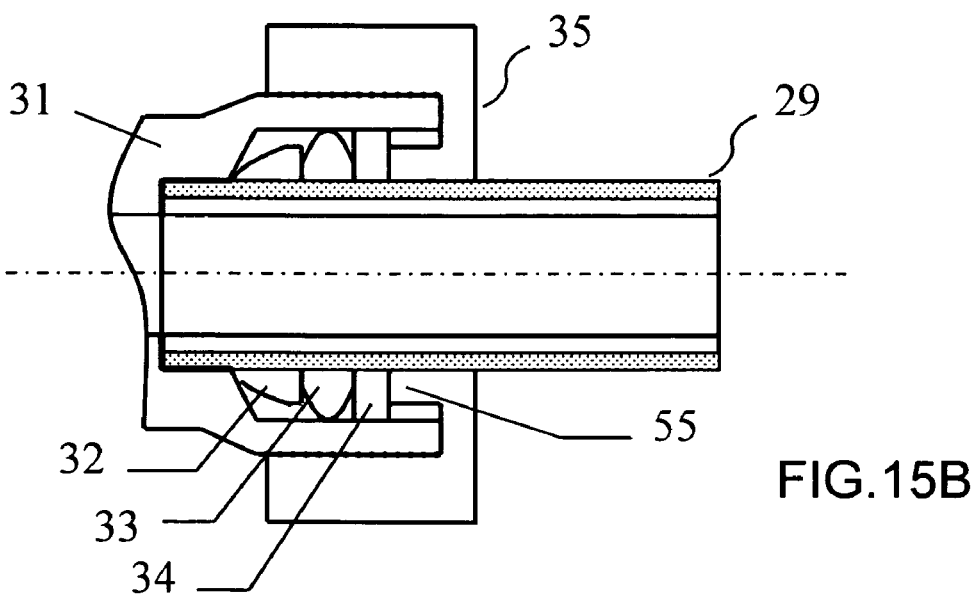

FIG. 15A is a schematic diagram illustrating the inner structure of the connector before the cap 35 is entirely screwed in. FIG. 15B is a schematic diagram illustrating the inner structure of the connector after the cap 35 is entirely screwed in. When the cap 35 is screwed in, the force from the cylinder 55 makes the washers tightly stacked together. Because the rubber washer 32 is elastic, when it is pressed, the surrounding gap between the pipe 29 and the body 31 is sealed, and thus leak is avoided. In addition, because of the pressure from the stainless steel washer 33 and the pressure from the cylinder 55, the spring washer 34 is squeezed, and thus it tightly locks around the pipe 29.

Figure 16A:
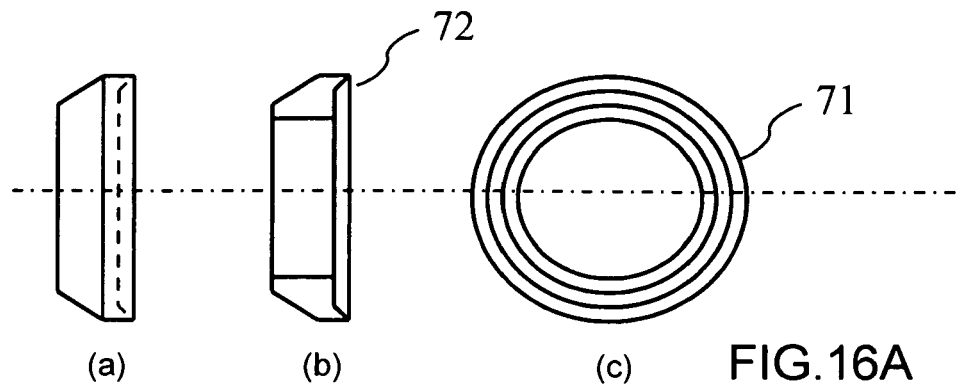
FIG. 16A is a schematic diagram illustrating a stainless steel washer with an extruding edge facing the end wall of the cap.
Figure 16B:
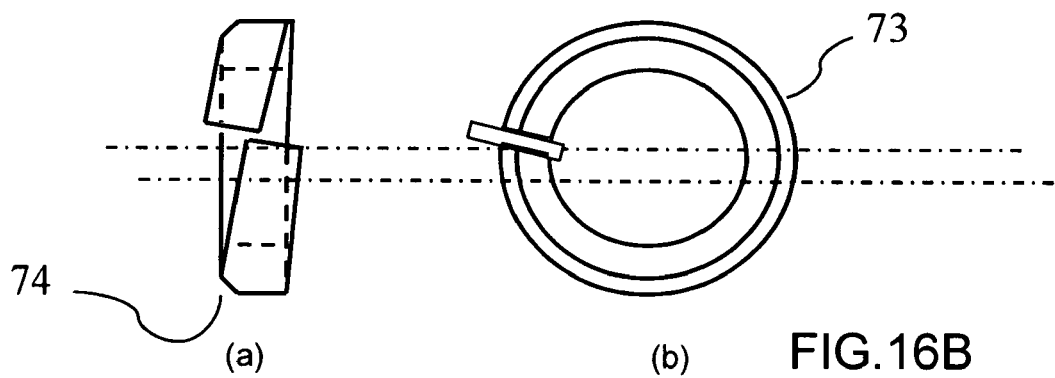
FIG. 16B is a schematic diagram illustrating a spring washer with a tapered edge facing the connector's body.
Figure 16C:
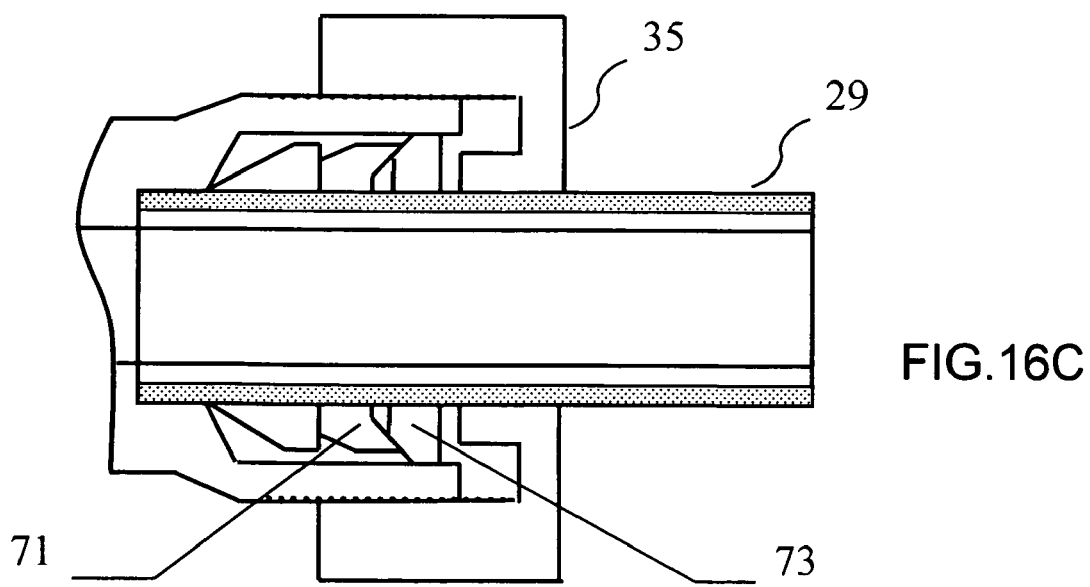

FIG. 16A is a schematic diagram illustrating a stainless steel washer 71 with an extruding edge 72 facing the end wall of the cap 35. FIG. 16B is a schematic diagram illustrating a spring washer 73 with a tapered edge 74 facing the connector body 31. FIG. 16C is a schematic diagram illustrating the inner structure of the connector when the cap 35 is being screwed in. The extruding edge 72 of the stainless steel washer 71 and the tapered edge 74 of the spring washer 73 are designed in such a manner that when they are squeezed together, the extruding edge 72 of the steel washer 71 applies a force along the axial direction to the tapered edge 74, and the tapered edge 74 changes the force into a force concentrating toward the center of the spring washer 34. The concentrating force makes the spring washer 34 locked around the pipe 29.

Although the invention has been described with reference to at least one specific embodiment, this description is not meant to be construed in a limiting sense. Various modifications of the disclosed embodiment, alternative embodiments or other equivalent solutions of implementing the disclosed pipe and connector will become apparent to those skilled in the art upon reference to the description of the invention. It is therefore contemplated that such modifications, equivalents, and alternatives can be made without departing from the spirit and scope of the present invention as defined in the appended claims.

The invention claimed is:

1. A process for manufacturing a plastic-lined metallic pipe for conveying liquid or gas, comprising steps of:
   placing an alloy outer pipe in a mould with a diameter slightly larger than the outer pipe's outer diameter;
   warming the outer pipe evenly to a first temperature;
   cooling a plastic inner pipe evenly to a second temperature at which the inner pipe's diameter is at its shortest point;
   inserting the inner pipe into the outer pipe to constitute an inner sleeve;
   drawing from both ends of the outer pipe along its axial direction to extend the outer pipe's length at a tensile ratio in a range of 0.1-1% such that the outer pipe's inner diameter is inwardly merged to the inner pipe's outer diameter; and
   cooling the outer pipe to a storage temperature such that the outer pipe's inner diameter and the inner pipe's outer diameter are melt-bond without an intermediate layer;
   wherein the second temperature is lower than the storage temperature.

2. The process of claim 1, wherein said plastic inner pipe is formed of a non-poisonous plastic suitable for conveying drinking-water.

3. The process of claim 2, wherein said plastic inner pipe is formed of polypropylene.

4. The process of claim 3, wherein said outer pipe is formed of aluminum alloy.

* * * * *